United States Patent [19]

Beck et al.

[11] 4,434,260

[45] Feb. 28, 1984

[54] THERMOPLASTIC RESIN SHAPING WITH OLEFIN/MALEIMIDE COPOLYMER LUBRICANT

[75] Inventors: Heinz Beck, Duren; Werner Holtvoigt, Lohne-Riessel; Ambar Mukerjee, Nideggen, all of Fed. Rep. of Germany

[73] Assignee: Akzona, Inc., Asheville, N.C.

[21] Appl. No.: 357,952

[22] Filed: Mar. 15, 1982

Related U.S. Application Data

[63] Continuation of Ser. No. 229,428, Jan. 29, 1981, abandoned, which is a continuation of Ser. No. 48,412, Jun. 14, 1979, abandoned.

[30] Foreign Application Priority Data

Jun. 14, 1978 [DE] Fed. Rep. of Germany ....... 2825962

[51] Int. Cl.³ .................... C08L 27/06; C08L 39/00
[52] U.S. Cl. .................................. 524/104; 525/205; 525/239; 525/378; 526/262; 528/322
[58] Field of Search ................ 526/262; 525/328, 378, 525/205, 239; 528/322; 260/326.5 R, 326.5 F, 326.5 FM; 524/104

[56] References Cited

U.S. PATENT DOCUMENTS 2,301,356 11/1942 Arnold et al. ........................ 526/262
3,053,814 9/1962 Hedrick ............................... 525/378
3,840,499 10/1974 DiGiulio ............................. 526/262

FOREIGN PATENT DOCUMENTS 1303606 1/1973 United Kingdom .

*Primary Examiner*—Harold D. Anderson
*Attorney, Agent, or Firm*—Frank W. Young; Robert F. Green

[57] ABSTRACT

Lubricant compositions comprising α-olefin/maleinimide copolymers is disclosed. Also disclosed is a process for the shaping of thermoplastic synthetic resins utilizing α-olefin/maleinimide copolymers.

3 Claims, No Drawings

THERMOPLASTIC RESIN SHAPING WITH OLEFIN/MALEIMIDE COPOLYMER LUBRICANT

This is a continuation of application Ser. No. 229,428, filed Jan. 28, 1981, which is a continuation of application Ser. No. 048,412, filed June 14, 1979, both now abandoned.

BACKGROUND OF THE INVENTION

This invention relates to lubricants for the processing of thermoplastic resins and to a process for shaping thermoplastic synthetic resins. More particularly, this invention relates to lubricants which are useful at high temperatures for the processing of thermoplastic synthetic resins and to a high temperature process for shaping thermoplastic synthetic resins.

Processes for shaping thermoplastic synthetic resins are well known, such as calendering, pressing, injection molding, extruding, and the like, at elevated temperatures and under compression loads. The heated mass of plastic material in such processing tends to adhere to the heated parts of the machine. The adhering material reaches a substantially longer retention time in the machines, resulting in the potential for greater thermal degradation. The foregoing results in the exhaustion of the stabilizer which is intended to prevent such degradation, although the processing operation has not yet been terminated. This results in the premature termination of the processing procedure.

In order to avoid the foregoing difficulties, suitable lubricants are added to the plastic powder in addition to the stabilizers, which lubricants are intended to reduce the internal and external friction of the melted mass and in such a manner to reduce the effect of shearing forces and/or to diffuse between the material in the plastic state and the heated parts of the machines, in order to prevent adhesion, resulting in longer retention of the material to be processed.

Good lubricants are already known in the art such as various types of waxes, fatty alcohols, glycerides, fatty acid amiles, fatty acid esters with low alcohols, such as butyl stearate, fatty acids, and paraffins.

$\alpha$olefin maleic copolymers and their derivatives have already been proposed as processing aids for use in masses of thermoplastic synthetic resins. From German Patent Disclosure No. 2,015,162 it is know to provide thermoplastic molding batches of polyester for injection molding purposes with a coating of ionic copolymers of $\alpha$-olefins and salts of $\alpha$, $\beta$-unsaturated monocarboxylic acids or dicarboxylic acids, a result of which is that the plastic material, after it has been molded, can easily be removed from the molds.

From British Pat. No. 764,014 it is known to add at least 0.1%, by weight, of a copolymer of an unsaturated acid anhydride with styrene, an olefin, or an alkylvinyl ether with alkyl groups of 1 to 25 carbon atoms to polyvinylchloride (PVC). The addition of this modifier greatly increases the impact tenacity. For this purpose, the copolymers are added in a quantity from 0.1 to 5%, by weight, and, during rolling are resistant at temperatures between 149° and 180° C., without addition of a special lubricant to the PVC powder. At higher temperatures, however, the lubricating effect declines to a greater extent, so that in the instance of this copolymer, a rolling resistance sufficient for processing does not exist.

Pursuant to an earlier proposal, esterified $\alpha$-olefin/maleic acid copolymers were discovered to be universal lubricants for the shaping of plastics; they act as internal, as well as external, lubricants.

It should be noted, however, that the foregoing lubricants which have been proposed so far in the art develop an adequate lubricating effect only at the customary processing temperatures, as they are, for example, usually employed in all extrusion processes. At higher temperatures, the lubricating effect appears to decline very rapidly.

In some processing methods, and when certain stabilizer systems are employed, it is necessary to perform the processing at temperatures from about 190° to about 210°., in order to obtain optimal mechanical properties of the shaped parts. For example, the flowability of PVC required for injection molding lies in a temperature range of about 200° C., at which temperature the polymer begins to display a large tendency to become degraded. The polymer must therefore be plasticized quickly, before degradation occurs. In the calendering process, in particular, high temperatures are reached because of the high shearing forces. Furthermore, the relatively extensive exposure to atmospheric oxygen will result in a decline in stability during processing on a calender. In a calender system, a temperature of about 200° C., or greater, is reached in the last roller gap. Consequently, in PVC calendering it is necessary to adapt the selection of stabilizer systems and processing auxiliaries to these high temperatures.

For manufacturing film for food packaging it is necessary to replace the toxic Ba-Cd stabilizers by organotin compounds. Customarily, mixtures of solid and of liquid tin stabilizers are employed. The foregoing is being done because of the difficulties associated with distributing the solid tin stabilizers. However, plastic masses containing liquid tin stabilizers exhibit a great adhesion tendency at processing temperatures of about 200° C. Such a tendency cannot be prevented by using the known lubricants and requires special flowing aids, such as acrylates. Even when formulations with very high proportions of tin stabilizers having a low adhesion tendency are employed, it is not possible to dispense with flowing aids. In addition to such flowing aids, high molecular polyethylene waxes and solid parafins are employed to prevent adhesion. It should be noted, however, that the addition of such agents only solves the problem of adhesion during the processing operation. In order to prevent adhesion of the film in the roll, or the adhesion of the shaped parts in the mold, in the case of injection molding, it is necessary to us amide waxes which have especially high release effects, as antiblocking agents, in addition to the flowing aids.

A great disadvantage results from the use of such flowing and anti-blocking auxiliaries in as much as their use limits the possibility for modifying the formulations. Furthermore, the typically employed amide waxes leads to deterioration in stability and color. Such difficulties occur, in particular, with stabilizer combinations containing liquid alkyl tin maleates and such stabilizers are used frequently, because of their excellent light stability.

In view of the foregoing, it was an object of the present invention to develop lubricants which, in the shaping of thermoplastic resins, act simultaneously as lubricants and parting compounds, resulting in a parting effect which is equal to, or in excess of, the known anti-blocking effects of the amide waxes, and which display an acceptably high lubricating effct, even at extreme processing temperatures.

SUMMARY OF THE INVENTION

Especially desirable lubricants have now been discovered comprising unsubstituted α-olefin/maleinimide copolymers. There has also been discovered a process which comprises shaping thermoplastic synthetic resins in the presence of an effective amount of an α-olefin /maleinimide copolymer, or a mixture thereof.

DETAILED DESCRIPTION OF THE PREFERRED EMBODIMENTS

As indicated, it has been surprisingly discovered that the α-olefin/maleinimide copolymers pursuant to the present invention are not only universal lubricants with both internal and external lubricating effects, permitting temperatures of about 200° C. and greater to be employed for the thermoplastic material to be processed, but, additionally said polymeric imides also display excellent anti-blocking effects.

The desired effect of the copolymers pursuant to the present invention appears to be optimal when they have an average molecular weight of from about 5,000 to about 60,000, preferably from about 10,000 to about 50,000.

The polymeric imides may be derived from one or more α-olefins containing, typically, on the average, from about 8 to about 24 carbon atoms, and maleinimide.

It has been determined that especially good results are obtained with α-olefin/maleinimide copolymers wherein the olefins contain from about 10 to about 20 carbon atoms. It should be noted that it is also possible to copolymerize mixtures of olefins with different numbers of carbon atoms, and maleic amhydride. The olefin/maleic anhydride copolymer, from which the polymeric imide is based, may consist of olefins and maleic anhydride in a molar ratio of about 0.8:1 to about 1.3:1. Preference is typically given to olefin/maleic anhydride copolymers in which the olefins/and maleic anhydride are present in a molar ratio of about 1:1. The molecular weights of the α-olefin/maleic anhydride copolymers from which the maleinimide copolymers are derived, vary over a wide range. Preferably, the α-olefin/maleic anhydride copolymers have an average molecular weight from about 10,000 to about 50,000.

The olefin/maleinimide copolymers of the present invention are readily accessible as the method for their synthesis is very simple. Such copolymers are especially suitable as lubricants with anti-blocking effect in the shaping of plastics wherein high temperatures are employed, such as in calendering, as well as in the processing of mixtures with hard formulations free of softening agents. The plastics in which the copolymers of the present invention are useful include all materials which may be processed by thermoplastic means, especially polyvinyl chloride.

It is possible to use the α-olefin/maleinimide copolymers of the present invention in combinatin with other known additives for the shaping of plastics, due to their high effectiveness and good compatibility with the typically employed stabilizers and lubricants. The term "shaping " is used herein to mean any process for altering the physical configuration of a plastic mass including calendering pressing, injection molding, and extruding.

Only a small quantity of the lubricant of the present invention need be added in order to achieve the desired effect of an external and internal lubricant, as well as an anti-blocking agent, in the plastic to be processed.

The present invention is explained in greater detail through the following non-limiting examples. In such examples the parts and percentages are based on weight.

EXAMPLE 1

Preparation of the Copolymer 376 g (1.27 mol) $C_{20}$-α-olefin and 98 g (1 mol) maleic anhydride are placed in a 3-neck, round-bottomed flask with stirrer, thermometer and reflux cooler. The reaction vessel is flushed with dry nitrogen, heated to 100° C, and 1 g dibenzoyl peroxide added thereto. 1 g peroxide is added after 3 hours and 2 g peroxide after 6 hours. After an increase in the viscosity of αthe reaction mixture is noted, another 160 g $C_{20}$-α-olefin are added in equal portions after the fourth and seventh hour. After a reaction time of 3 hours, the excess olefin is distilled off under a vacuum.

the polymeric anhydride, or its solution in xylene, is placed in an autoclave and heated to 100 to 160° C. (the solid polymer requires higher temperatures); gaseous ammonia is introduced up to a pressure of 3 to 6 atmospheres. The reaction is exothermic. After an hour, the reaction mixture is diluted with xylene and transferred to a 3-neck flask. After that, a small quantity of p-toluenesulfonic acid is added and the water of reaction distilled off under azeotropic conditions. The imide is isolated by distilling off of the solvent.

EXAMPLE 2

444 g $C_{20}$-α-olefin (1.5 mol) and 70 g $C_{10}$-α-olefin (0.5 mol) are mixed with 160 g xylene in a reaction vessel flushed with nitrogen, and heated to 100° C. 196 g (2 mol) maleic anhydride and 12 g dilaurayl peroxide are added at 30 minute intervals in 10 equal portions. After the tenth addition, at which the temperature has been raised to 155 to 160° C. 3 portions of t-butyl hydroperoxide of 1 g each are added at 30 minute intervals. 30 minutes after the last addition, the reaction mixture is diluted with 560 g xylene. The polymeric anhydride is then reacted as in Example 1.

EXAMPLE 3

296 g (1 mol) $C_{20}$-α-olefin and 140 g (1 mol) $C_{10}$-α-olefin are copolymerizxed with 2 mol maleic anhydride as in Example 2 and converted to imide in the same manner.

The molecular weight of the copolymers is determined by means of a gel permeation chronatographic method. This involves a high-pressure, chromatographic method, in which a mixture is separated into its components in keeping with their molecular weights. A correlation exists between retention time and molecular weight, so that the molecular weight can be determined by means of calibrating substances. Tetrahydrofurane is used as mobile phase, while a differential refractometer serves as detector. The column is a microstyragel column of the firm Waters Associates, as described in the company publication AN 143, of June 1974.

EXAMPLE 4

Utilization of the Polymeic Imides as Lubricants 87 parts of a suspension polyvinyl chloride (K value 60), 2 parts of a butyl-tin stabilizer combination, consisting of a mixture of dibutyl tin maleate and dibutyl tin thioglycolate, 0.5 parts "E wax" of the firm Hoechst (montanic acid ester), 13 parts of an impact strength component "Kane B 28" (copolymer of butadiene, styrene and methacrylate), and 0.15 or 0.30 parts of the polymeric imides prepared according to Examples 1 to 3 are premixed in a high-speed laboratory mixer. For comparison purposes, the same formulation is tested using "Acrawax C" of the firm Hoechst (ethylene distearamide) as an agent in keeping with the state of the art, instead of the lubricants pursuant to the invention.

The mixture is plasticized on a 2-roller laboratory rolling mill with a roller diameter of 110 +225 mm, a gap width of 0.8 to 1 mm, at a speed of about 20 rpm and at temperatures of 200 and 210° C. At these temperatures, a rolling skin is formed within a minute. The time from charging of the rolling mill to adhesion on the roller surfaces, or to a breakdown in stability (brown discoloration of the film) is measured.

The results of these high-temperature rolling experiments are compiled in Table 1.

samples adhere when hydroxystearic acid of Acrawax C is used.

EXAMPLE 6

Oven Ageing 0.15 parts lubricant, or comparable flowing aids, together with the other additives and the PVC are premixed in a laboratory mixer. The mixture is plasticized for 10 minutes at 170° C. and a speed of 20 rpm in a 2-roller laboratory rolling mill with a roller diameter of 110 ×225 mm and a gap width of 0.8 to 1 mm. The samples taken from the rolling skin (0.4 mm thick) are exposed to a testing temperature of 180° C. in a heat-ageing oven with vertically revolving cage. The changes in color tone are determined at 10 minute intervals.

In the case of the lubricants of Examples 1 to 3, discoloration is formed after 210 minutes. With Acrawax C, discoloration occurs after 180 minutes.

What is claimed is:

1. In a process for shaping at least one thermoplastic synthetic resin, the improvement comprising shaping the resin in the presence of a lubricant-effective amount of an α-olefin/maleinimide copolymer having an average molecular weight determined by gel permeation chromatography from about 5,000 to about 60,000.

2. the process of claim 1 wherein the α-olefin contains from about 8 to about 24 carbon atoms.

3. The process of claim 2 wherein the α-olefin-maleinimide copolymer has a molar ratio of α-olefin to maleinimide of about 0.8:1 to about 1.8:1.

TABLE 1

| Olefin | Molecular weight of the copolymer | Rolling stability at 200° C./0.15 pts of lubricant minutes | Adhering on the roller after min. | Rolling stability at 210° C./0.15 pts of lubricant minutes | Rolling stability at 210° C./0.30 pts of lubricant minutes |
| --- | --- | --- | --- | --- | --- |
| Olefin mixture $C_{10}/C_{20}$ | 23,500 | 18 | does not adhere up to 20 min. | 7 | 10 |
| Olefin mixture $C_{10}/C_{20}$ | 22,500 | 17 | does not adhere up to 20 min. | 8 | — |
| Olefin $C_{20}$ | 54,000 | 18 | adheres after 18 minutes | 3 | — |
| Acrawax C | | 16 | adheres after 20 minutes skin too soft | 0 | 0 |

EXAMPLE 5

Anti-blocking Effect

The polymeric imides are premixed with PVC and the other additives as in Example 4. Samples measuring 50×100 mm are cut from the films made at 180° C., which contain 0.15 parts lubricant or flowing aid. The samples are placed one on top of the other and for 24 hours kept under a pressure of 5 kg at 100° C.

No adhesion tendency is observed with the lubricants pursuant to Examples 1 to 3. On the other hand, the